United States Patent
Swett et al.

[15] 3,698,783
[45] Oct. 17, 1972

[54] STORAGE CONTAINER FOR CELERY OR THE LIKE

[72] Inventors: James B. Swett, Barrington, R.I.; Sidney Z. Smith, Worcester, Mass.

[73] Assignee: Dart Industries, Inc., Los Angeles, Calif.

[22] Filed: Jan. 28, 1970

[21] Appl. No.: 6,462

[52] U.S. Cl.................312/351, 99/171 R, 99/269, 220/17, 220/60, 312/229
[51] Int. Cl. ..............................................B65d 25/00
[58] Field of Search........312/284, 229, 351; 99/181, 99/193, 171 RE, 269; 150/.5; 220/17

[56] References Cited

UNITED STATES PATENTS

| | | | |
|---|---|---|---|
| 3,451,328 | 6/1969 | Swett | 312/351 |
| 1,337,852 | 4/1920 | Szuba | 312/351 |
| 1,946,884 | 2/1934 | Rutherford | 312/351 |
| 2,004,449 | 6/1935 | Stanley | 312/284 |
| 2,489,543 | 11/1949 | Sanford | 312/351 |
| 2,661,567 | 12/1953 | Paege | 312/351 |
| 3,241,706 | 3/1966 | Monaco et al. | 312/284 |

FOREIGN PATENTS OR APPLICATIONS

| | | | |
|---|---|---|---|
| 9,858 | 5/1899 | Great Britain | 312/351 |

*Primary Examiner*—Bobby R. Gay
*Assistant Examiner*—Darrell Marquette
*Attorney*—Leigh B. Taylor, Paul R. Wylie and Harold R. Beck

[57] ABSTRACT

A storage container for celery or the like comprising a container adapted to be sealed to prevent ingress or egress of moisture. The container has a support particularly adapted to position the contained vegetable above the moisture which will collect in the bottom of the container. The support also positions the vegetable at areas of minimized points of contact.

1 Claim, 3 Drawing Figures

PATENTED OCT 17 1972 3,698,783

INVENTORS
JAMES B. SWETT
SIDNEY Z. SMITH
BY
Leigh B. Taylor
ATTORNEY

STORAGE CONTAINER FOR CELERY OR THE LIKE

This invention generally relates to a plastic foodstuff container and more particularly to a container assembly adapted for the preparation and storage of celery or other similar vegetables or the like.

It is known that leaf type foodstuffs such as celery are more appetizing and present a more desirable appearance when such are maintained evenly moist and are in a crisp condition. It is also known that celery and other vegetables will maintain such desirable appearance and condition for longer periods of time if they are stored in a moist cool atmosphere and especially so when kept out of residual liquids in the container.

It is therefore an object of the present invention to provide means by which such vegetables may be conveniently stored in a convenient manner which affords the attributes of the desirable aforementioned environmental conditions. It has been found that a container capable of being hermetically sealed which is generally shaped to conform to the shape and size of celery stalks and which has been provided with a suitable support means for the vegetables, forms such a convenient atmosphere. Thus, celery, for example, may be prepared and supported within a moist and hermetically controlled area and be maintained out of direct contact with any water which may collect at the bottom of the container, and accordingly be so stored under those conditions found to be more favorable to its preservation.

With the above and other objects in view that will hereinafter appear, the nature of the invention will be more clearly understood by reference to the following detailed description, the appended claims and the several views illustrated in the accompanying drawings.

Figure 1:
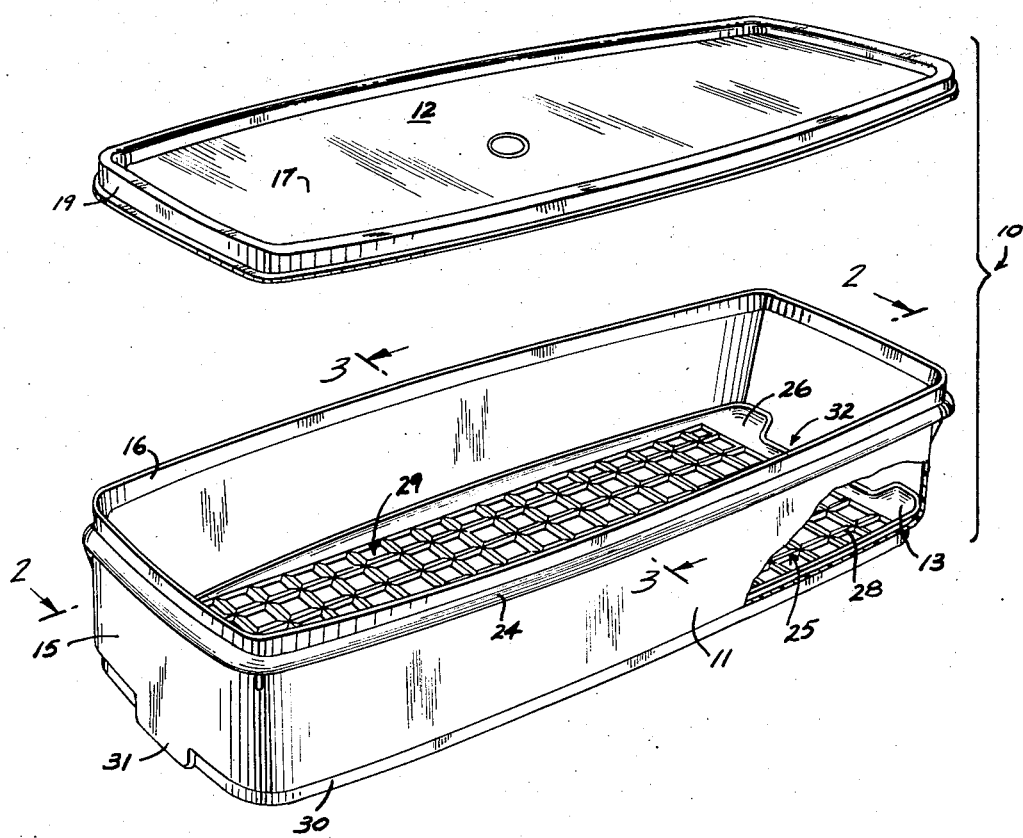
FIG. 1 is an exploded perspective view of the container of the present invention with parts broken away for clarity.

In the drawings, the component portions of the container means 10 include a container 11, a closure 12 therefor, and a tray or support 13. The container 11 is generally formed with a substantially flat base 14 having peripheral and integral side walls 15 upstanding therefrom. Such side walls 15 terminate in an open upper end defined by upper terminal edge portions 16.

The closure 12 is comprised of a top wall portion 17, the periphery of which is provided with an inverted groove 19 for receipt of the terminal edge portion 16 of the container. Such inverted groove 19 (FIG. 3) is comprised of an inner wall 20, an outer wall 21 and a connecting wall 22. The cover seal may be further provided with a horizontally extending lip 23 dependent from the outer wall 21. A combination stiffening and grasping means 24 is positioned slightly below the upper terminal portions of the container.

As is apparent in all of the drawings, the support 13 is comprised primarily of a grid-like supporting surface 25, an upstanding peripheral lip 26, and downwardly directed flanges 27. The surface 25 further includes a plurality of interconnected triangularly shaped ribs 28 between which are openings 29. This surface, due to the container construction, more fully described below, and because of the flanges 27 which act as supporting legs, is elevated above the container base or bottom 14. Thus, any residual liquid or condensation present within the container will tend to drain into the space 28 provided below the supporting surface 25.

As indicated, the ribs 28 are triangularly shaped and the apexes thereof are directed upwardly. This then minimizes the area of contact between the contained vegetables and the tray 13 and so presents the maximum of vegetable surface to the moist atmosphere which is so desirable in obtaining the crisp characteristics of such produce.

Each end of the tray also includes a recessed area 32 which enables the user to easily grasp same for removal from the container. This particular arrangement therefore permits such removal without emptying the contents of the container and without inverting the container. Thus, excess collections of water or other liquids can be easily disposed of or water may be easily added to the container without unduly disturbing the contents thereof.

Figure 2:
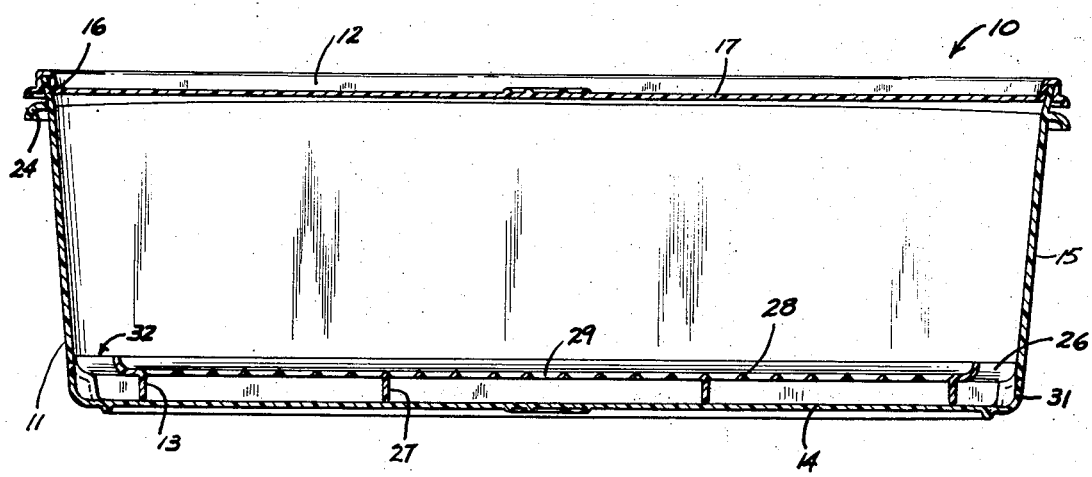
FIG. 2 is a cross-sectional view of the container shown in FIG. 1 taken along line 2—2.
Figure 3:
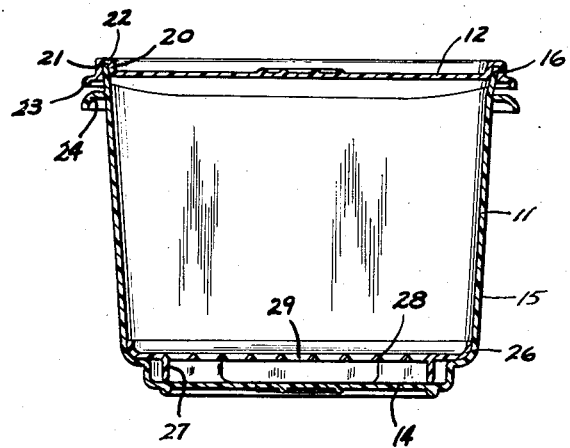
FIG. 3 is a cross-sectional view of the container taken along line 3—3 of FIG. 1.

Referring now to FIGS. 2 and 3, it will be apparent that a ledge 30 is fashioned into the sidewalls 15 of the container at a position adjacent the base 14. This ledge extends substantially all around the container with the exception of two places where downward projections 31 break that continuity. The projections are preferably positioned in the container end walls and are adapted to be in alignment with the try recessed areas 32 when it is properly positioned in the container. The combined recesses and projections thus accommodate entry of a user's finger digits under the tray facilitating its removal as mentioned above. It should be obvious that the particular placement of the respective recesses 32 and projections 31 is somewhat discretionary; however, the placement shown and described is preferred.

With continued reference to FIGS. 2 and 3, note that the ledge 30 also functions as a supporting means for the tray 13 in that the upstanding peripheral lip 26 engages the ledge and so acts in concert with the downwardly directed flanges 27. This, of course, tends to stabilize the tray 13 to prevent shifting and sagging thereof.

Alternatively, the ribs 28 may be integrally molded into the base 14 of the container. As indicated above, however, in the preferred embodiment, it is contemplated that the removable tray be employed. The latter type of construction in addition to the advantages enumerated also renders the container more flexibly suitable for other varied uses.

It should further be pointed out that the preferred embodiment of the container closure and tray herein described are manufactures of plastic materials. Likewise, the container and tray are generally made of high and low density polyethylene blends or of polypropylene while the closure is preferably made of a low density polyethylene material. However, other materials may be employed with equally good results.

It will be apparent from the foregoing description that novel and advantageous provisions have been made for carrying out the desired objects of the invention. However, attention is directed to the fact that variations other than those above disclosed may be made in the example form of the invention disclosed herein without departing from the spirit and scope thereof as defined in the appended claims.

We claim:

1. A food storage device for perishables such as celery or the like and including a container having a base with peripheral side walls extending upwardly therefrom and a ledge portion provided therein adjacent said base and extending substantially therearound, a removable foodstuff supporting tray, a substantial portion of which incorporates a plurality of interconnected triangularly shaped ribs integral with and interspersed between an upstanding peripheral lip that contacts the side walls and the ledge portion of the container, said upstanding peripheral lip of said tray including at least two recessed areas adapted to mate with corresponding projections of the container ledge portion, which recesses and projections overlie one another so that they accommodate receipt of the finger digits, and a sealing cover for said container and including peripheral sealing means in contact with the free terminal peripheral portions of said upstanding side walls so as to hermetically seal said container.

* * * * *